United States Patent [19]

Sakabe et al.

[11] 4,451,869
[45] May 29, 1984

[54] LAMINATED CERAMIC CAPACITOR

[75] Inventors: Yukio Sakabe, Kyoto; Goro Nishioka, Yawata; Yoshimasa Azuma, Kyoto; Susumu Mori, Fukui, all of Japan

[73] Assignee: Murata Manufacturing Co., Ltd., Japan

[21] Appl. No.: 491,887

[22] Filed: May 5, 1983

[30] Foreign Application Priority Data

Apr. 4, 1983 [JP] Japan .................................. 58-59852

[51] Int. Cl.³ ........................ H01G 1/00; H01G 4/12
[52] U.S. Cl. ................................... 361/309; 361/321
[58] Field of Search ............... 361/306, 308, 309, 310, 361/313, 320, 321

[56] References Cited

U.S. PATENT DOCUMENTS

| 3,612,963 | 10/1971 | Piper et al. | 361/309 X |
| 3,757,177 | 9/1973 | Buehler | 361/321 |
| 4,101,952 | 7/1978 | Burn | 361/320 X |
| 4,246,625 | 1/1981 | Prakash | 361/321 |
| 4,260,663 | 4/1981 | Hagemann et al. | 361/321 X |
| 4,308,570 | 12/1981 | Burn | 361/320 |

FOREIGN PATENT DOCUMENTS 53-89962  8/1978  Japan .................................. 361/321

Primary Examiner—Donald A. Griffin
Attorney, Agent, or Firm—Ostrolenk, Faber, Gerb & Soffen

[57] ABSTRACT

A laminated ceramic capacitor, comprising a plurality of internal electrodes (1) composed of a base metal to give electrostatic capacity and configured in a laminated state with non-reducing ceramics (2) mutually held between each of two of the internal electrodes, and a pair of external electrodes (3) connected to the associated ones of the internal electrodes (1) for taking out the electrostatic capacity. The external electrodes (3) are formed with copper which contains zinc borosilicate glass.

13 Claims, 1 Drawing Figure

LAMINATED CERAMIC CAPACITOR

BACKGROUND OF THE INVENTION

1. Field of the Invention

The present invention relates to a laminated ceramic capacitor, and more specifically to a laminated ceramic capacitor in which a base metal is used for internal electrodes and fired copper electrodes are used as external electrodes connected to the internal electrodes.

2. Description of the Prior Art

A laminated ceramic capacitor, as shown in FIG. 1, typically comprises a plurality of internal electrodes 1. Ceramics 2 intervene between the respective ones of the internal electrodes 1. The internal electrodes 1 are connected to either of external electrodes 3.

To produce such a laminated ceramic capacitor, the following process may be adopted, for example. Ceramic green sheets about 50 to 100 μm thick are prepared by means of screen process, "Doctor-blade" method, spray method, or the like, and then these ceramic green sheets are printed with a paste containing metal powder which is to become the internal electrodes. A plurality of the structures thus obtained are stacked and then bonded into monolithic configuration by applying heat and pressure. The monolithic structure thus obtained is fired in the temperature range of 1250°–1400° C. in a natural atmosphere to make a sintered body, and, the end surface thereof are painted with a metal paste, which is then fired to form the external electrodes 3 to be connected to the associated internal electrodes 1.

In this case, it is necessary to satisfy the following requirements for materials of the internal electrodes 1.

(1) The materials possess melting points above the temperature at which ceramics begin to be sintered.

(2) The materials are not oxidized in contact with ceramics or do not react with ceramics even if they are heated up at temperatures around 1300° C. in a natural atmosphere.

The materials for the internal electrodes 1 which satisfy the respective requirements described above include noble metals, such as palladium, platinum, silver-palladium and the like. Such noble metals have been used for the internal electrodes 1 in many conventional laminated ceramic capacitors.

However, while the noble metals described above possess excellent characteristics as the materials for the internal electrodes 1, on the contrary, the proportion contributed by the noble metals to in the cost of the laminated ceramic capacitor has reached 20-50% because of their expensiveness, which is maximally responsible for a rise in prices.

To cope with such problems, attempts to employ cheap base metals as the materials for the internal electrodes 1 came to be made. But, for example, if nickel is used as a base metal, it is, however, oxidized by heating in an oxidizing atmosphere above 300° C. and reacts with ceramics, so that no inner electrodes can be suitably formed. In order to pervent the oxidation of the nickel, the ceramics should be fired together with the nickel internal electrodes 1 in a neutral or reducing atmosphere, but, in general, the ceramics are so strongly reduced and the specific resistance thereof is lowered to $10-10^8 \Omega$. cm, thus making it impossible to be used as dielectric for capacitors.

On the other hand, the external electrodes 3, as described above, are formed by a firing process. In general, a paste containing silver or silver-palladium has been used as a material to make these external electrodes 3. The paste will be applied and then fired. This is a general process. However, as in the case of the internal electrodes 1, the use of expensive noble metals has been responsible for a rise of the prices of such laminated ceramic capacitors. Furthermore, an inconvenient phenomenon arises when such a laminated ceramic capacitor in the form of a chip type component is soldered to a print circuit board or the like in that much silver or silver-palladium forming the external electrodes 3 is eaten up because of merging into the solder. Moreover, when a base metal, such as nickel, iron, cobalt and so on, are used for the internal electrodes 1 described above, a problem of poor electrical connection takes place because such base metals have poor affinity for the noble metals of the external electrodes 3.

In order to cope with such problems concerning the external electrodes 3, the utilization of cheap copper as a material for the external electrodes 3 has been attempted. However, the formation of the external electrodes 3 of copper by way of firing a copper paste is significantly associated with a development of glass frit included in such a paste with copper powder. When the external electrodes 3 of copper are formed by firing the copper paste in a natural atmosphere using lead borosilicate, which is one of the representatives of glass frit, the copper is oxidized and becomes the oxide of copper very easily. Therefore, they become improper as electrodes because of the increase of electrical resistance. Although it might be one approach to fire a copper paste in a neutral or weak-reducing atmosphere, in such a case, improprieties, such as reduction of the ceramics, decrease of the insulation resistance of the ceramics, and an increases of the dielectric loss will take place.

To cope with such problems, U.S. Pat. No. 4,353,153 has proposed that a paste of nickel or copper is applied to the end surfaces of unfired laminated ceramic body using non-reductive substances as dielectric materials and then fired in a neutral or weak-reducing atmosphere. The paste disclosed in that patent is made in such manner that powder of nickel or copper, glass frit of barium borosilicate or barium alminosilicate, and manganese are mixed into varnish and organic vehicle. According to the patent, a laminated ceramic capacitor is obtained in such a way that a paste of nickel or copper is applied on a dielectric ceramic green sheet, which is made from $BaTiO_3$, $CaZrO_3$, $BaCO_3$, and $MnO_2$, then a laminated body is formed by stacking a plurality of such green sheets, then, a paste of nickel described above is applied to the end surfaces of the laminated body, and then the resulting structure is fired in an argon atmosphere at 1350° C. for 5 hours.

However, although this process may be effective in the case that a paste of nickel is used as the end termination electrodes, it is not effective in the case of using a paste of copper because the melting point of copper (1083° C.) is lower than that of nickel (1453° C.), so that the formation of electrodes is impossible due to the fusion of copper in a step wherein the end termination electrodes are fired together with the unfired laminated ceramic body as described above. Furthermore, although the nickel electrode is usable in a sense, it can not be practically soldered on a circuit board, and therefore arises an inconvenience in that a metal layer capable of soldering such as of silver or the like should be formed on the nickel electrodes.

On the other hand, a process in which a paste of copper is fired to form external electrodes on the end surfaces of the laminated body of non-reducing ceramic as fired already and having internal electrodes of base metal is considered possible. In this case, barium aluminosilicate derivatives have been used as glass frit. However, by use of such glass frit, the external electrodes capable of drawing satisfactory electric characteristics from the laminated body of non-reducing ceramic can not be provided.

SUMMARY OF THE INVENTION

The present invention is to provide a laminated ceramic capacitor wherein external electrodes of fired copper are formed on a laminated body of non-reducing dielectric ceramics in which internal electrodes are provided with a base metal, such as nickel, iron, cobalt, and so on.

Especially, the present invention is characterized by the use of zinc borosilicate glass frit as glass contained in the fired copper electrodes. A laminated ceramic capacitor having excellent electrical characteristics can be afforded by the use of the zinc borosilicate glass frit.

According to the present invention, in a laminated ceramic capacitor including laminated dielectric of non-reducing ceramics in which internal electrodes are formed with a base metal, such as nickel, iron, cobalt, or the like, external electrodes are made up of fired copper containing zinc borosilicate glass. The laminated ceramic capacitor has the characteristic of effectively taking out the electrical properties of the non-reducing laminated ceramic dielectrics as compared with the case of using other glass frit.

DESCRIPTION OF THE PREFERRED EMBODIMENTS

Figure 1:
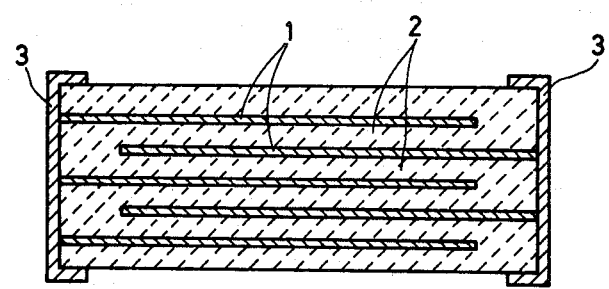
FIG. 1 is a cross section showing a typical structure of a laminated ceramic capacitor.

In what follows, the present invention will be explained with respect to various preferred embodiments.

Referring back to FIG. 1, in the embodiments of the present invention, nickel, iron, cobalt, and the like, which are all cheap base metals, are used as materials constituting the internal electrodes 1.

In the case of using nickel, iron, cobalt, and the like described above as examples of materials for the internal electrodes 1, as similar with the conventional examples, a paste containing at least one of these metal powders is printed on a ceramic green sheet, and the ceramics are fired together with the metal paste in a neutral or reducing atmosphere. To avoid the problem of reduction of ceramics which has arisen, non-reducing dielectric ceramic compositions are employed. The following compositions are illustrated as such non-reducing dielectric ceramic compositions;

(1) Non-reducing dielelctric ceramic compositions in barium titanate dielectric ceramic compositions shown by the following composition formula:

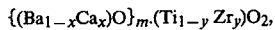

$\{(Ba_{1-x}Ca_x)O\}_m \cdot (Ti_{1-y}Zr_y)O_2$, wherein m, x and y are limited in the following ranges;
$1.005 \leq m \leq 1.03$,
$0.02 \leq x \leq 0.22$, and
$0 < y \leq 0.20$.

(2) Non-reducing dielelctric ceramic compositions in barium titanate dielelctric ceramic compositions shown by the following composition formula:

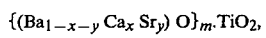

$\{(Ba_{1-x-y}Ca_x Sr_y)O\}_m \cdot TiO_2$, wherein m, x and y are in the following ranges, respectively;
$1.005 \leq m \leq 1.03$,
$0.02 \leq x \leq 0.22$, and
$0.05 \leq y \leq 0.35$.

(3) Non-reducing dielectric ceramic compositions in barium titanate dielectric ceramic compositions shown by the following composition formula:

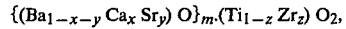

$\{(Ba_{1-x-y}Ca_x Sr_y)O\}_m \cdot (Ti_{1-z}Zr_z)O_2$, wherein m, x, y and z are in the following ranges, respectively;
$1.005 \leq m \leq 1.03$,
$0.02 \leq x \leq 0.22$,
$0.05 \leq y \leq 0.35$, and
$0.00 < z \leq 0.20$.

(4) Non-reducing dielectric ceramic compositions comprising $CaZrO_3$ and $MnO_2$ and having the following general formula:

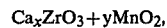

$Ca_xZrO_3 + yMnO_2$, wherein x of $Ca_xZrO_3$ ranges as follows and $MnO_2$ (=y) takes the following proportion by weight when the weight of $Ca_xZrO_3$ is taken as 1.00.
$0.85 \leq x \leq 1.30$
$0.05 \leq y \leq 0.08$ (proportion of weight)

(5) Non-reducing dielectric ceramic compositions comprising $(BaCa)ZrO_3$ and $MnO_2$ and having the following general formula:

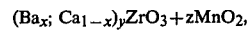

$(Ba_x; Ca_{1-x})_yZrO_3 + zMnO_2$, wherein x and y of $(Ba_xCa_{1-x})_yZrO_3$ are in the following ranges and $MnO_2$ (=x) takes the following proportion by weight when the weight of $(Ba_xCa_{1-x})_yZrO_3$ is taken as 1.00.
$0 < x \leq 0.20$
$0.85 \leq y \leq 1.30$
$0.005 \leq z \leq 0.08$ (proportion by weight)

Firing these non-reducing dielectric ceramic compositions (1) to (5) even in a neutral or reducing atmosphere does not cause the decrease of insulation resistance or the increase of dielectric loss of the ceramics. Accordingly, while a base metal, such as nickel, iron, cobalt or the like, can be used as inner electrodes, these non-reducing dielectric ceramic compositions (1) to (5) can be fired in a neutral or reducing atmosphere while preventing the base metals from being oxidized or reacting with the ceeramics.

Zinc borosilicate is used as glass frit which is employed in the step of firing a copper paste to form the external electrodes 3 in the present invention. Firing the copper paste in a neutral or reducing atmosphere has favorably become possible with the aid of the glass frit having compositions described below.

Concrete compositions of this zinc borosilicate glass frit are as follows;
ZnO: 30–55% by weight,
$B_2O_3$: 25–45% by weight, SiO$_2$: 5–15% by weight,
at least one of Li$_2$O, Na$_2$O, and K$_2$O: 1–10% by weight, and
at least one of MgO, CaO, and BaO: 2–20% by weight.

Moreover, another glass frit which further includes the following compositions in addition to the glass frit compositions described above can be used.
CdO: 2–8% by weight
SnO$_2$: 2–10% by weight Furthermore, another concrete compositions of zinc borosilicate glass frit are given as follows;
ZnO: 25–40 mole %,
B$_2$O$_3$: 15–40 mole %,
SiO$_2$: 15–40 mole %,
(CaO+MgO): 5–30 mole %,
Al$_2$O$_3$: 0–5 mole %, and
Li$_2$O: 0–10 mole %.

A copper paste containing zinc borosilicate glass frit is made up in the following preparation ratio;
copper powder (particle size: 0.5–10 μm): 57–82% by weight,
glass frit (particle size: 0.5–2 μm): 2–8% by weight, and
organic vehicle: 15–35% by weight.

In the following, the detail will be explained according to the concrete examples.

EXAMPLE 1

A raw material slurry was prepared in such manner that a mixed aqueous solution of organic binder, dispersing agent, and defoaming agent of 15% by weight and water of 50% by weight were added to pre-fired raw material prepared to have the composition formula:

$$\{(Ba_{0.91}\ Ca_{0.10})\ O\}_{1.01}\ (Ti_{0.84}Zr_{0.16})\ O_2,$$

and then ground and mixed together with 50% by weight of water in a ball mill. By using this raw material slurry, ceramic green sheets 60 μm thick were processed by the "Doctor-blade" method. The ceramic green sheets were printed with a paste of nickel powder sized about 1 μm to provide internal electrode patterns. Then, the twenty ceramic green sheets were stacked with the internal electrodes being opposed to one another, and were made up to a monolithic structure by applying heat and pressure. The monolithic structure was first heated up to 500° C. in air to burn organic binder contained in the ceramic green sheets and in the internal electrode paste, and then heated to 1340° C. at 100° C./hr of temperature rise ratio in a reducing atmosphere of H$_2$/N$_2$=2/100. After retaining the temperature of 1340° C. for 2 hours, it was cooled down to 800° C. at 100° C./hr of cooling rate and then naturally cooled down to room temperature with the atmosphere kept as it was.

A copper paste comprising the following composition was applied to the end surfaces of the fired sample thus obtained. The copper paste is for forming external electrodes for taking out capacity.
Copper powder (1–5 μm): 75% by weight
Zinc borosilicate glass frit (0.5–2 μm): 5% by weight
Organic vehicle: 20% by weight The glass frit employed in this example was of a zinc borosilicate type, such as: ZnO 45% by weight, B$_2$O$_3$ 30% by weight, SiO$_2$ 10% by weight, Li$_2$O 6% by weight, and BaO 9% by weight. The organic vehicle was cellulose dissolved in Cellusolve.

Next, the copper paste was fired at 800° C. in a weak-reducing atmosphere for 30 minutes to form external electrodes.

A laminated ceramic capacitor thus obtained exhibited the following results of the determination of the characteristics.
Size: width=4.8 mm, length=5.6 mm, and thickness=1.0 mm.
Capacity: 0.85 μF
Dielectric loss (tan δ): 2.50%
Insulation resistance (IR): $3.0 \times 10^9$ Ω·cm
Capacity × IR: 2550 MΩ·μF

REFERENCE EXAMPLES 1A AND 1B

Copper pastes composed of the following compositions were applied on the end surfaces of the pre-fired material in Example 1 described above as external electrodes for taking out capacity.

As to Reference Example 1A,
copper powder (1–5 μm): 75% by weight,
barium borosilicate glass frit (0.5–2 μm): 5% by weight, and
organic vehicle: 20% by weight.

The glass frit employed in Reference Example 1A was of a barium borosilicate type, such as: BaO 40% by weight, B$_2$O$_3$ 50% by weight, and SiO$_2$ 10% by weight, and the organic vehicle employed therein was cellulose dissolved in Cellusolve.

As to Reference Example 1B,
copper powder (1–5 μm): 73% by weight,
alminoborosilicate glass frit (0.5–2 μm): 7% by weight, and
organic vehicle: 20% by weight.

The glass frit employed in Reference Example 1B was of an alminoborosilicate type comprising Al$_2$O$_3$ 40% by weight, B$_2$O$_3$ 50% by weight, and SiO$_2$ 10% by weight, and the organic vehicle employed therein was cellulose dissolved in Cellusolve.

Samples in which the copper pastes of Reference Examples 1A and 1B were applied on the end surfaces of the fired structures were treated by heating in a weak-reducing atmosphere at 800° C. for 30 minutes to form fired copper electrodes on the end surfaces thereof.

The following results were given by the determination of the characteristics of each of laminated ceramic capacitors thus obtained.

| example | capacity | dielectric loss tan δ (%) | IR (Ω · cm) | capacity x IR (MΩ · μF) |
|---------|----------|---------------------------|-------------|-------------------------|
| 1A | 0.01 (μF) | 7.8 | $4.7 \times 10^9$ | 470 |
| 1B | 1200 (pF) | 4.8 | $7 \times 10^{11}$ | 840 |

EXAMPLE 2

In Example 2, raw material given by the composition formula:

$$\{(Ba_{0.69}\ Ca_{0.02}\ Sr_{0.030})\ O\}_{1.01}TiO_2$$

was employed.

Zinc borosilicate glass frit employed in Example 2 was composed of the composition, such as: ZnO$_2$ 41% by weight, B$_2$O$_3$ 28% by weight, SiO$_2$ 8% by weight, Na$_2$O 7% by weight, CaO 4% by weight, CdO 6% by weight, and SnO$_2$ 6% by weight.

Then, laminated ceramic capacitors were produced in the same manner as Example 1.

By the determination of the characteristics of each produced laminated ceramic capacitor, the following results were given.

| example | capacity | dielectric loss tan δ (%) | IR (Ω · cm) | capacity x IR (M Ω · μF) |
|---|---|---|---|---|
| 2 | 1.05 | 2.40 | $4.8 \times 10^9$ | 4900 |

REFERENCE EXAMPLES 2A AND 2B

By using material having the same composition as Example 2, laminated ceramic capacitors were prepared under the same conditions as Reference Examples 1A and 1B, respectively. Following results were given by the determination of the characteristics of each laminated ceramic capacitor thus obtained.

| example | capacity | dielectric loss tan δ (%) | IR (Ω · cm) | capacity x IR (M Ω · μF) |
|---|---|---|---|---|
| 2A | 450 nF | 6.9 | $1.5 \times 10^9$ | 680 |
| 2B | 150 pF | 4.5 | $5.3 \times 10^{11}$ | 800 |

EXAMPLE 3

Raw material consisting of the composition formula, such as:

$$\{(Ba_{0.76} Ca_{0.05} Sr_{0.20}) O\}_{1.01}(Ti_{0.92} Zr_{0.08}) O_2$$

was employed.

Zinc borocilicate glass frit shown in Example 1 was used.

Laminated ceramic capacitors were made in the same manner as Example 1.

By the determination of the characteristics of the laminated ceramic capacitors thus obtained, the following results were given.

| example | capacity (μF) | dielectric loss tan δ (%) | IR (Ω · cm) | capacity x IR (M Ω · μF) |
|---|---|---|---|---|
| 3 | 0.85 | 2.50 | $4.1 \times 10^9$ | 3485 |

REFERENCE EXAMPLES 3A AND 3B

By using raw material composed of the same composition as Example 3, laminated ceramic capacitors were prepared under the same conditions as Reference Examples 1A and 1B, respectively. The following results were given by the determination of the characteristics of each laminated ceramic capacitor thus obtained.

| example | capacity | dielectric loss tan δ (%) | IR (Ω · cm) | capacity x IR (M Ω · μF) |
|---|---|---|---|---|
| 3A | 540 nF | 7.5% | $7.2 \times 10^8$ | 388 |
| 3B | 190 pF | 3.9% | $1.4 \times 10^{11}$ | 26.6 |

EXAMPLE 4

Raw material employed in Example 4 had the composition formula, such as: $Ca_{1.10}ZrO_3 + 2\%$ by weight $MnO_2$.

Zinc borosilicate glass frit employed herein was the same as Example 2. Laminated ceramic capacitors were prepared in the same manner as Example 1.

By the determination of the characteristics of the laminated ceramic capacitors thus obtained, the following results were given.

| example | capacity at 1 MHz | Q value (1 MHz) | IR (Ω · cm) | capacity x IR (M Ω · μF) |
|---|---|---|---|---|
| 4 | 4.2 nF | 8000 | $2.5 \times 10^{12}$ | 10500 |

REFERENCE EXAMPLES 4A AND 4B

Laminated ceramic capacitors were prepared by the use of raw material having the same composition as Example 4 under the same conditions as Reference Examples 1A and 1B, respectively. The determination of the characteristics of each laminated ceramic capacitor thus obtained showed the following results.

| example | capacity | Q value (1 MHz) | IR (Ω · cm) | capacity x IR (M Ω · μF) |
|---|---|---|---|---|
| 4A | 800 pF | 200 | $7 \times 10^{12}$ | 5600 |
| 4B | 150 pF | 85 | $1.0 \times 10^{13}$ | 1500 |

EXAMPLE 5

Raw material having the composition formula, such as: $(Ba_{0.1} Ca_{0.9})_{1.0} ZrO_3 + 3\%$ by weight $MnO_2$ was employed in Example 5.

Zinc borosilicate glass frit employed herein was the same as in Example 1.

Laminated ceramic capacitors were prepared in the same manner as Example 1.

Following results were given by determining the characteristics of the laminated ceramic capacitors thus obtained.

| example | capacity | Q value (1 MHz) | IR (Ω · cm) | capacity x IR (M Ω · μF) |
|---|---|---|---|---|
| 5 | 6.7 nF | 12000 | $3.0 \times 10^{12}$ | 20100 |

REFERENCE EXAMPLES 5A AND 5B

Laminated ceramic capacitors were prepared by the use of raw material having the same composition as in Example 5 under the same conditions as in Reference Examples 1A and 1B. The following results were given by the determination of the characteristics of each laminated ceramic capacitor thus obtained.

| example | capacity | Q value (1 MHz) | IR (Ω · cm) | capacity x IR (M Ω · μF) |
|---|---|---|---|---|
| 5A | 1.8 nF | 750 | $4.2 \times 10^{11}$ | 756 |
| 5B | 150 pF | 180 | $1.7 \times 10^{13}$ | 2550 |

What is claimed is:

1. A laminated ceramic capacitor wherein a plurality of internal electrodes are formed in a laminated state with ceramic layers mutually held between each of two of the internal electrodes to give electrostatic capacity, and a pair of external electrodes are connected to the associated ones of said internal electrodes for taking out the electrostatic capacity, said laminated ceramic capacitor characterized by said ceramic layers being of non-reducing ceramics, said internal electrodes being composed of a base metal, and said external electrodes being of fired copper including zinc borosilicate glass.

2. A laminated ceramic capacitor in accordance with claim 1, wherein said internal electrodes consist of at least one of base metals selected from the group consisting of nickel, iron, and cobalt.

3. A laminated ceramic capacitor in accordance with claim 1, wherein said zinc borosilicate glass contained in said external electrodes consists of the following compositions:
   $ZnO$: 30-55% by weight,
   $B_2O_3$: 25-45% by weight,
   $SiO_2$: 5-15% by weight,
   at least one selected from $LiO_2$, $Na_2O$, and $K_2O$: 1-10% by weight, and
   at least one selected from $MgO$, $CaO$, and $BaO$: 2-20% by weight.

4. A laminated ceramic capacitor in accordance with claim 1, wherein said zinc borosilicate glass contained in said external electrodes consists of the following compositions:
   $ZnO$: 30-55% by weight,
   $B_2O_3$: 25-45% by weight,
   $SiO_2$: 5-15% by weight,
   at least one selected from $Li_2O$, $Na_2O$, and $K_2O$: 1-10% by weight, and
   at least one selected from $MgO$, $CaO$, and $BaO$: 2-20% by weight,
   $CdO$: 2-8% by weight, and
   $SnO_2$: 2-10% by weight.

5. A laminated ceramic capacitor in accordance with claim 1, wherein there are 2 to 8 parts by weight of the zinc borosilicate glass for 57-82 parts by weight of copper.

6. A laminated ceramic capacitor in accordance with claim 5, wherein said internal electrodes are of nickel.

7. A laminated ceramic capacitor in accordance with claim 6, wherein the composition of the zinc borosilicate glass is $ZnO$ 45%, $B_2O_3$ 30%, $SiO_2$ 10% $LiO_2$ 6% and $B_aO$ 9%.

8. A laminated ceramic capacitor in accordance with claim 7, wherein the non-reducing ceramic is $$\{(Ba_{0.91} Ca_{0.10}) O\} 1.01 (Ti_{0.84} Zr_{0.16}) O_2.$$

9. A laminated ceramic capacitor in accordance with claim 7, wherein the non-reducing ceramic is between $$\{(Ba_{0.75} Ca_{0.05} Sr_{0.20}) O\}_{1.01} (Ti_{0.92} Zr_{0.08}) O_2.$$

10. A laminated ceramic capacitor in accordance with claim 7, wherein the non-reducing ceramic is $$(Ba_{0.1} Ca_{0.9})_{1.0} ZrO_3 + 3\% \text{ by weight } MnO_2.$$

11. A laminated ceramic capacitor in accordance with claim 6 in which the zinc borosilicate glass is contained $ZnO$ 41%, $B_2O_3$ 28%, $SiO_2$ 8%, $Na_2O$ 7%, $CaO$ 4%, $CdO$ 6% and $SnO_2$ 6%.

12. A laminated ceramic capacitor in accordance with claim 11 in which the non-reducing ceramic is $$\{Ba_{0.69} Ca_{0.02} Sr_{0.30}) O\}_{1.01} TiO_2.$$

13. A laminated ceramic capacitor in accordance with claim 11 in which the non-reducing ceramic is $$Ca_{1.0} ZrO_3 + 2\% \text{ by weight } MnO_2.$$

* * * * *